United States Patent [19]
Dunne

[11] Patent Number: 5,359,404
[45] Date of Patent: * Oct. 25, 1994

[54] LASER-BASED SPEED MEASURING DEVICE

[75] Inventor: Jeremy G. Dunne, Littleton, Colo.

[73] Assignee: Laser Technology, Inc., Englewood, Colo.

[*] Notice: The portion of the term of this patent subsequent to Mar. 1, 2011 has been disclaimed.

[21] Appl. No.: 945,233

[22] Filed: Sep. 14, 1992

Related U.S. Application Data

[63] Continuation-in-part of Ser. No. 914,764, Jul. 15, 1992, Pat. No. 5,291,262, and Ser. No. 877,259, Apr. 28, 1992, which is a continuation of Ser. No. 489,720, Feb. 26, 1990, which is a continuation of Ser. No. 329,303, Mar. 27, 1989.

[51] Int. Cl.$^5$ .................. G01C 3/08; G01P 3/36
[52] U.S. Cl. .................. 356/5; 342/94; 342/95; 342/105; 356/28; 368/120
[58] Field of Search ............ 356/5, 28; 368/120; 342/94, 95, 105

[56] References Cited

U.S. PATENT DOCUMENTS

| | | | |
|---|---|---|---|
| 3,698,811 | 10/1972 | Weil | 356/5 |
| 4,346,989 | 8/1982 | Gort et al. | 356/5 |
| 4,527,894 | 7/1985 | Goede et al. | 356/28 |
| 4,569,599 | 2/1986 | Bolkow et al. | 356/5 |
| 4,620,788 | 11/1986 | Giger | 356/5 |
| 4,948,246 | 8/1990 | Shigematsu | 356/5 |
| 5,046,839 | 9/1991 | Krangle | 356/5 |

*Primary Examiner*—Stephen C. Buczinski
*Attorney, Agent, or Firm*—Trask, Britt & Rossa

[57] ABSTRACT

A laser speed detector is described which includes a laser rangefinder which determines the time-of-flight of an infrared laser pulse to a target and a microprocessor-based microcontroller. The device is small enough to be easily hand-held, and includes a trigger and a sighting scope for a user to visually select a target and to trigger operation of the device upon the selected target. The laser rangefinder includes self-calibrating interpolation circuitry, a digital logic-operated gate for reflected laser pulses in which both the "opening" and the "closing" of the gate can be selectably set by the microcontroller, and dual collimation of the outgoing laser pulse such that a minor portion of the outgoing laser pulse is sent to means for producing a timing reference signal.

35 Claims, 8 Drawing Sheets

LASER-BASED SPEED MEASURING DEVICE

RELATED APPLICATIONS

This application is a continuation-in-part of U.S. application Ser. No. 07/877,259 filed Apr. 28, 1992, which is a continuation of U.S. Ser. No. 07/489,720 filed Feb. 26, 1990, which is in turn a continuation of U.S. Ser. No. 07/329,303 filed Mar. 27, 1989 (both now abandoned). This application is also a continuation-in-part of copending application U.S. Ser. No. 07/914,764, filed Jul. 15, 1992, now U.S. Pat. No. 5,291,200.

BACKGROUND OF THE INVENTION

1. Field

The invention relates to devices for detecting the speed of moving objects, and more particularly to a laser speed detector.

2. State of the Art

Devices for detecting the speed of a moving object have a number of uses in the military, in police work, etc. A commonly used type of device is a radar detection unit, which aims radar waves at the object and times the reflected radar waves to estimate the speed of the object. However, many motorists now carry radar wave detectors which provide a warning signal when a radar gun is being used in the vicinity, allowing the motorist time to slow to a legal speed.

There is therefore a need for a new type of speed detector which does not use radar waves and cannot be detected by a radar wave detector. Preferably, such a speed detector would use a very short duration pulse of electromagnetic energy, which would be detectable only by a person operating the detector unit. Also, such a detector is desirably accurate, reliable, compact and easily portable. Further desirably, the device would "lock on" to accept only reflected pulse light from the selected target, and would be difficult to jam.

SUMMARY OF THE INVENTION

The invention comprises a laser speed detector comprising a laser rangefinder, a sighting scope for a user to visually select a target with an operably-disposed trigger for triggering operation of the detector upon the selected target, and a microprocessor-based microcontroller which is controllingly and communicatively interconnected to the laser rangefinder. In a highly preferred embodiment, the instrument is small enough to be easily hand-held.

The laser rangefinder, under the supervision of the controller, fires a series of laser pulses at a selected remote target at known time intervals, and detects reflected laser light from each pulse. Preferably, the pulses are fired at equally-spaced intervals. The laser rangefinder further determines count data reflective of the time-of-flight of each pulse to the target and back, and provides these data to the control means. These count data comprise the respective arrival times of a REF (reference) pulse representing the firing time of the laser pulse, and an RX pulse representing reflected laser pulse light.

The microcontroller is configured to read these count values and to compute from them, the time-of-flight of the laser pulse and in turn, the distance to the target. The controller then computes the velocity of the target relative to the speed detector from the change in distance to the target divided by the known elapsed time between firing of the pulses.

The laser rangefinder has several notable features which provide significant improvement in accuracy and reliability (not necessarily listed in order of importance). First, a crystal clock-based timing analysis circuit includes a gating circuit which is a digital logic, edge-sensitive gate for which both the "opening" and the "closing" of the time window can be selectably set by the microcontroller. In a preferred embodiment, the microcontroller is configured to alternately widen and narrow the window to selectively lock on "true" RX pulses and exclude pulses due to noise or other factors.

Second, the timing analysis circuitry is constructed to generate self-calibration pulses and to process them in the same manner as the REF and RX pulses, thereby producing a set of calibration interpolation counts. The controller uses these calibration interpolation counts along with the REF and RX interpolation counts to compute self-calibrated values of the respective fractional portions of the clock periods at which the REF and RX pulses arrived. The self-calibration pulses comprise a pair of pulses, referred to for simplicity as TMIN and TMAX, which differ by a known integral number of clock periods (with neither TMIN nor TMAX being zero). Together, TMIN and TMAX define an expanded interpolation interval within which the fractional portions of the RX and REF arrival times are interpolated. This self-calibrating interpolation provides greatly enhanced resolution and accuracy of distance measurements based on elapsed time.

Third, the laser rangefinder has a first collimator which directs a major portion of an outgoing laser pulse toward the selected target, and a second collimator which redirects a minor portion of the laser pulse to produce a timing reference signal. In one embodiment, the minor portion of the laser pulse is sent to a second light detector separate from a first light detector (here embodied as a silicon avalanche photodiode detector or "APD") which focusses and receives reflected laser light. Alternatively, the minor portion of the laser pulse is sent to the same detector which detects the returned laser light.

THE DRAWINGS

In the drawings, which illustrate what is presently regarded as the best mode for executing the invention, like reference numbers indicate like elements, and:

DETAILED DESCRIPTION OF THE ILLUSTRATED EMBODIMENTS

Figure 1:
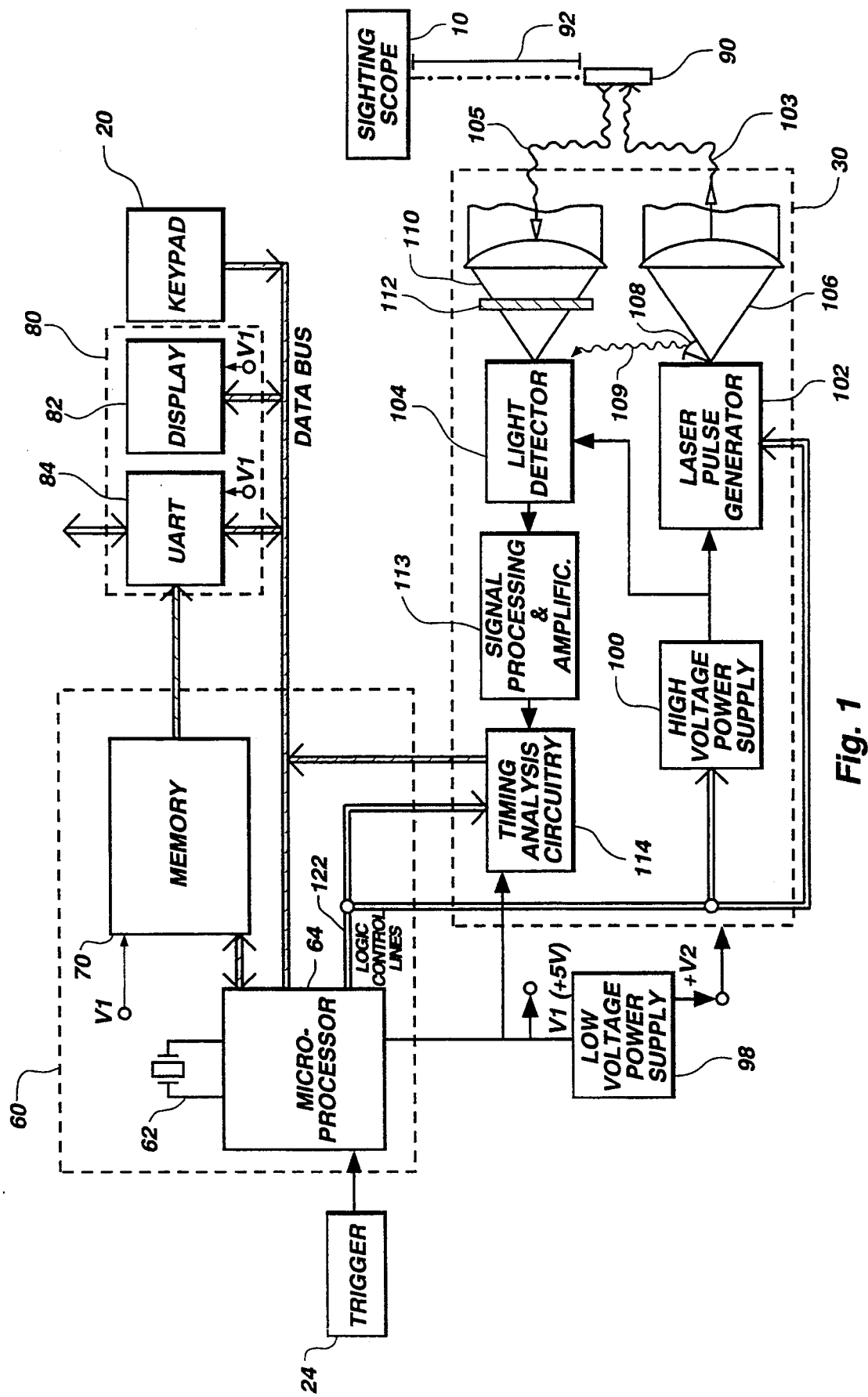
FIG. 1 is a block diagram of a working embodiment of the laser speed measuring device of the invention.

FIG. 1 depicts a working embodiment of the laser speed detector. This embodiment incorporates the following basic components: a sighting scope 10 for a user to visually select a target; a keypad 20 and trigger 24 which together comprise user operation means; a laser rangefinding system 30; a microcontroller 60 including a microprocessor 64 and a communicatively associated memory unit 70; and data output means 80 which is here shown to comprise a display 82 and a UART 84 connectible to provide data to an external computer or data logger.

Microcontroller 60 is communicatively interfaced to send logic commands and to read and store data from laser rangefinder 30. Microcontroller 60 is configured to supervise the sending of a series of laser pulses spaced by known time intervals toward the target to determine its distance at each time interval. Microcontroller 60 is also configured to compute the distance to the target from the time-of-flight of each individual laser pulse. Finally, microcontroller 60 computes the velocity of a moving target relative to a fixed observer (or alternatively the velocity of a user relative to a fixed object), from the distances obtained for each of a series of pulses and the time intervals between firing of the individual pulses. In the preferred embodiment, the pulses are equally spaced by an interval of the order of milliseconds, and time-of-flight data for a plurality of pulses are used with a least-squares algorithm. Twenty to 150 pulses are generally sufficient for accurate determination of speed, depending on the desired accuracy. Other relevant details of the computations are disclosed in subsequent segments of this application.

Sighting scope 10 is provided for a user to select and aim the speed detector at a selected target. The sighting scope is operably associated with laser rangefinder 30 such that when a user sights on target 90 with the sighting scope, the laser pulse generator 102 and light detector 104 are simultaneously aimed at the target.

When the speed detector is aimed at a target 90, the user then operates trigger 24 to initiate functioning of the speed detector in a preselected mode. Trigger 24 is communicatively connected to send a trigger signal to microprocessor 64. In response to receipt of the trigger signal, microcontroller 60 initiates the sending of a train of laser pulses, as well as certain calibrating operations.

Laser rangefinder system 30 determines a distance 92 from the speed detector to target 90 (distance 92 is schematically depicted along the sightline from sighting scope 10 to target 90). Rangefinder system 30 includes a high voltage power supply 100 connected to power a laser pulse generator 102 and to provide bias voltage to a light detector 104. In the preferred embodiment, laser pulse generator 102 is constructed to produce short pulses (duration of between about 5 and about 100 nanoseconds) of infrared light spaced by a selected fixed interval of between about 1 and about 10 milliseconds. Optionally, the rangefinder may be constructed to allow a user to set a different fixed interval as desired for different targets or target speeds. In an alternate embodiment, the pulses may be spaced at different selected intervals in a semi-random fashion, that is, the spacing between succeeding pulses may be varied according to a randomized code sequence. The latter embodiment would be particularly effective in the case where a laser pulse jamming instrument was being used by the target to interfere with speed detection.

A first collimator 106 is operably associated with laser pulse generator 102 for directing a major portion of an outgoing laser pulse 103 generated by laser pulse generator 102 towards a target 90. A second collimator 108 is disposed to redirect a minor portion 109 of each outgoing laser pulse 103 to generate a timing reference signal. In the embodiment of FIG. 1, the redirected portion 109 is sent to the APD light detector 104, which outputs an analog signal containing information both as to the timing reference pulse and the subsequently-received reflected light pulse. In an alternate embodiment depicted in FIG. 2, the redirected portion 109 is sent to a separate light detector, specifically a PIN photodetector 210 which provides a second detector signal constituting the timing reference signal.

Returning to FIG. 1, focussing optics 110 are operably associated with light detector 104 for focussing received light thereon. A bandpass filter 112 is desirably associated with focussing optics 110 for ensuring that detector 104 only receives light of wavelengths near the expected wavelength based on the wavelength of the emitted laser pulse. In the working embodiment, bandpass filter 112 is a narrow band interference filter. Light detector 104 is also connected to detector signal processing circuitry 113.

Operation of the laser rangefinding subsystem 30 is controlled by a microcontroller 60 via logic control lines 122 which are connected to laser pulse generator 102 and the detector signal processing circuitry 113. The detector signal processing circuitry 113 is further connected to provide detector signals reflective of laser light received by light detector 104 to microcontroller 120 and associated elements including a memory 70, display 82 and UART 84. Memory 70 includes both nonvolatile and volatile components, and is configured for nonvolatile storage of instructions for the microcontroller, semipermanent or permanent storage of instrument parameters, look-up tables, and the like; temporary storage of data readings made by the laser speed detector; and a volatile working memory for initialization, numerical manipulations, and the like.

Figure 2:
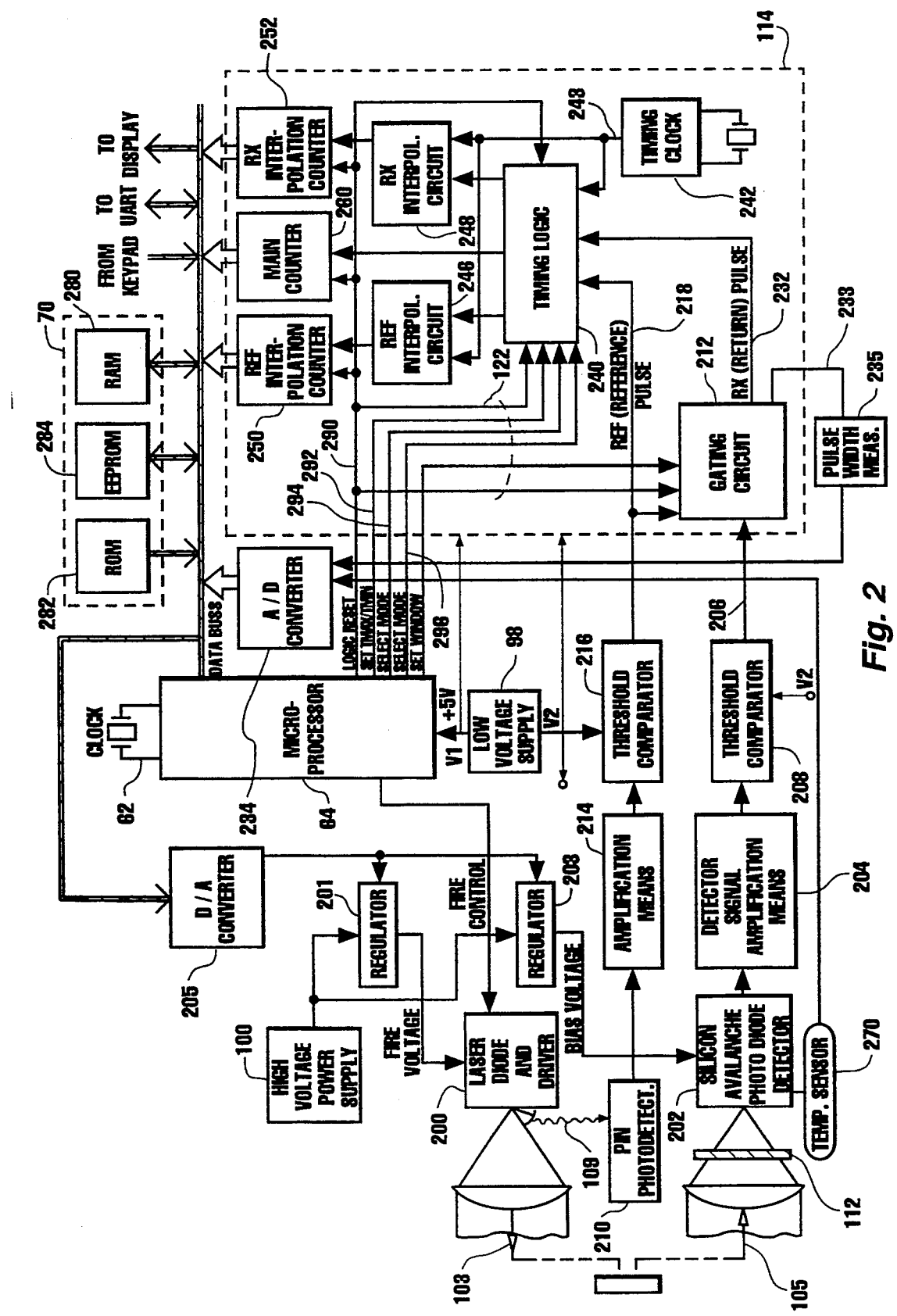
FIG. 2 is a block diagram detailing the laser rangefinder system of FIG. 1.

A working embodiment of rangefinding subsystem 30 is depicted in greater detail in FIG. 2. In this embodiment, the laser pulse generator takes the form of a laser diode 200 having an operably-connected driver, while the light detector is a silicon avalanche photodiode detector 202 (abbreviated hereinafter as APD 202). High voltage power supply 100 supplies power to laser diode 200 and APD 202 detector 104 via respective linear regulators 201, 203. Regulator 201 controls the firing voltage of laser diode 200 and regulator 203 controls the bias voltage applied to APD 202. Both regulators 201, 203 are connected via a D/A converter 205 to microprocessor 64 which controls them to provide the appropriate respective voltages. The firing voltage is adjusted so that the laser diode outputs the desired optical power. The bias voltage is adjusted so that APD 202 is operated at the desired sensitivity.

APD 202 produces a signal current in response to the receipt of light passing through filter 112. This signal current is passed through amplification means 204 to be amplified and filtered to reject slowly varying interference signals. The amplified detector signal is then sent to a threshold comparator 208. If the amplified detector signal exceeds the preset threshold of comparator 208, it is sent to a gating circuit 212.

A second photodetector 210 which is here embodied as a PIN semiconductor photodetector is disposed to receive the redirected pulse portion 109 of the outgoing laser pulse 103. Upon receipt of the redirected pulse portion 109, PIN photodetector 210 generates an analog signal which is sent to amplification means 214 and in turn to a threshold comparator 216. The output of threshold comparator 216 constitutes a reference signal 218 which represents the time at which the outgoing laser pulse 103 was emitted. Reference signal 218 is sent to timing analysis circuitry 114.

A temperature sensor 270 is disposed to sense the temperature of APD 202 and to provide temperature readings to microcontroller 60. In response to these temperature readings, microcontroller 60 consults a lookup table stored in memory 70 to determine the desired value of bias voltage to be applied to APD 202 and to control regulator 203 to adjust the bias voltage as needed to correspond to the desired value. Optionally, microprocessor 64 adjusts the firing voltage applied to laser diode 200 via regulator 201 in accordance with a firing voltage lookup table stored in memory 70.

Timing analysis circuitry 114, which in the embodiment of FIG. 2 comprises gating circuit 212, timing logic 240, clock 242, interpolation circuits 246, 248, interpolation counters 250, 252, and main counter 260, operates to determine the arrival times of the respective rising edges of reference and RX pulses 218, 232, in terms of the number of cycles of clock 242. These count times are temporarily stored in main counter 260 and interpolation counters 250, 252. Microcontroller 60 reads and stores the clock count times from the counters and from these values computes the time-of-flight of the laser pulse. The time-of-flight is divisible by twice the speed of light to give the distance from the speed detector to the target.

A significant feature of the design of timing analysis circuitry 114, is its mutual configuration with microcontroller 60 to provide self-calibrated interpolated values of the respective fractional portions of the arrival times within the corresponding clock periods in which reference (REF) and reflected light (RX) pulses 218 and 232 are received. That is, the arrival times of the REF and RX pulses generally fall somewhere within a clock period. Thus, the true elapsed time between the REF and RX pulses comprises the number of whole clock periods elapsed, plus the fractional portion of the clock period occurring just after the receipt of the REF pulse and the fractional portion of the clock period occurring just prior to receipt of the RX pulse. These two fractional portions will be referred to as REF fractional portion and RX fractional portion, respectively.

The self-calibrated interpolated arrival times are obtained by 1) construction of timing logic circuit 240 to process the REF and RX pulses to produce corresponding REF and RX interpolation pulses respectively comprising the REF fractional portion and the RX fractional portion; 2) construction of timing logic circuit 240 to generate a pair of self-calibration pulses TMIN and TMAX which bracket a chosen interpolation width; 3) sending the REF interpolation pulse through a REF interpolation circuit 246 and the RX interpolation pulse through an RX interpolation circuit 248 to produce respectively REF and RX interpolated count values; 4) sending both self-calibration pulses TMIN and TMAX through each of interpolation circuits 246, 248, thereby producing two respective sets of self-calibration values TMIN-REF, TMAX-REF and TMIN-RX, TMAX-RX; and 5) configuration of microcontroller 60 to compute the REF and RX fractional portions from the respective self-calibration values and the appropriate REF or RX interpolated count values. Microcontroller 60 is further configured to compute the time-of-flight from the number of whole clock periods (acquired by main counter 260 through timing logic 240) and the REF and RX interpolated count values.

The design described in the preceding paragraph is particularly advantageous in that it substantially eliminates errors resulting from drift in the interpolation circuits and timing logic or variability of component tolerances. The speed detector so constructed can determine distances to a resolution of a few millimeters or less with very high accuracy.

The arrival times are here defined as the times at which the respective rising edges of REF and RX pulses 218, 232 are transmitted through the respective threshold comparators 208, 216. However, it will be recognized that with appropriate modifications to comparators 208, 216 and/or gating circuit 212, any other point present on both REF and RX pulses 218, 232 may be used to represent the arrival times of the pulses.

Microprocessor 64 is connected to set the select lines 294, 296 into multiplexer MUX2 of timing logic 240 (FIG. 6) to control sending of calibration pulses TMIN, TMAX to interpolation circuits 246, 248. Generation of the calibration pulses by timing logic 242 is initiated at least once during each measurement cycle upon operation of the trigger by a user. Preferably, the self-calibration cycle is performed a plurality of times, perhaps 8 or more, per measurement cycle. Microprocessor 64 is also connected to reset all the logic elements in timing analysis circuitry as necessary at the start of each measurement and between production of the TMIN, TMAX calibration pulses and the REF and RX interpolation pulses.

In a preferred embodiment, each measurement cycle comprises the firing of a plurality of laser pulses at a preset interval (which is significantly longer than the time to receive the reflected pulse light), and averaging the elapsed time between REF and RX pulses for most or all of the plurality of fired pulses.

Specific circuits embodying various elements of timing analysis circuitry 114 are functionally depicted in FIGS. 3, 4A, 4B, and 6.

Gating circuit 212 (depicted in greater detail in FIG. 3), ensures that only detector pulses produced by APD 202 within a selected time window following emission of laser pulse 103 are accepted as representing returned laser pulse light 105, and sent to the timing logic 240 as RX (return) pulse signal 232 for analysis. A detector pulse 206 arriving before or after the selected window is not transmitted by gating circuit 212 to timing logic 240 and does not receive further processing. Gating circuit 212 also outputs a digital pulse width signal 233, which is reflective of the width of the RX pulse. RX pulse width signal 233 is sent to microcontroller 60 via a pulse width measuring circuit 235 and an A/D converter 234, where it is used to derive a correction factor to compensate for saturation of APD 202 and/or the amplification means 204.

Gating circuit 212 is a digital logic-operated gate, in which both the delay time (the time at which the window "opens") and the time at which the window "closes" can be independently selectably set via microprocessor 60, as directed by a user or by a program stored in memory 70. That is, the delay time can be changed with or without a change in the "closing" time, and vice-versa.

Additionally, the gate is edge-sensitive, that is, only a detector pulse whose rising edge falls within the window will be accepted and transmitted as an RX pulse. If only the peak or the falling edge of a detector pulse falls within the window, it will be rejected. The use of edge-sensitive gate components provides increased accuracy in the selection of RX pulses.

In a highly preferred embodiment, microcontroller 60 is configured to iteratively and independently adjust the times of the opening and/or closing of the gate for a series of laser pulses fired at a single target, to establish a window which accurately defines "true" RX pulses from the target. This adjustment is performed generally as follows: 1) When the first REF pulse in the series arrives at the gate, the window is opened very wide and the delay time is set to be short. If a detector pulse is received within the first window, then 2) when the second REF pulse arrives the window is narrowed and centered on the arrival time of the first detector pulse (by shifting the opening and/or closing time of the window as necessary). If the second detector pulse is not received within the second window, then 3) the window is widened again for the third REF pulse. However, if the second detector pulse is received within the second window, then 4) the window is further narrowed for the fourth REF pulse, and so on. When the window is narrowed it may also be re-centered (the delay time changed) on the average of the receipt times of specified detector pulses. These steps of widening and narrowing the window are repeated as indicated until microprocessor 60 determines that a window which appropriately defines the arrival of the "true" RX pulses has been established. Such a window may for example be determined as the window within which a desired (high) proportion of the detector pulses falls within the window.

The gating circuit with the microcontroller configured as described to vary independently the opening and closing times of the RX window, and to iteratively narrow and widen the RX window, causes the rangefinder to effectively "lock on" to a target, and avoid errors due to detector or circuit noise, or readings made from non-target objects adjacent the selected target. Also, jaunting of the laser return signal is very difficult with the speed detector so designed.

Figure 3:
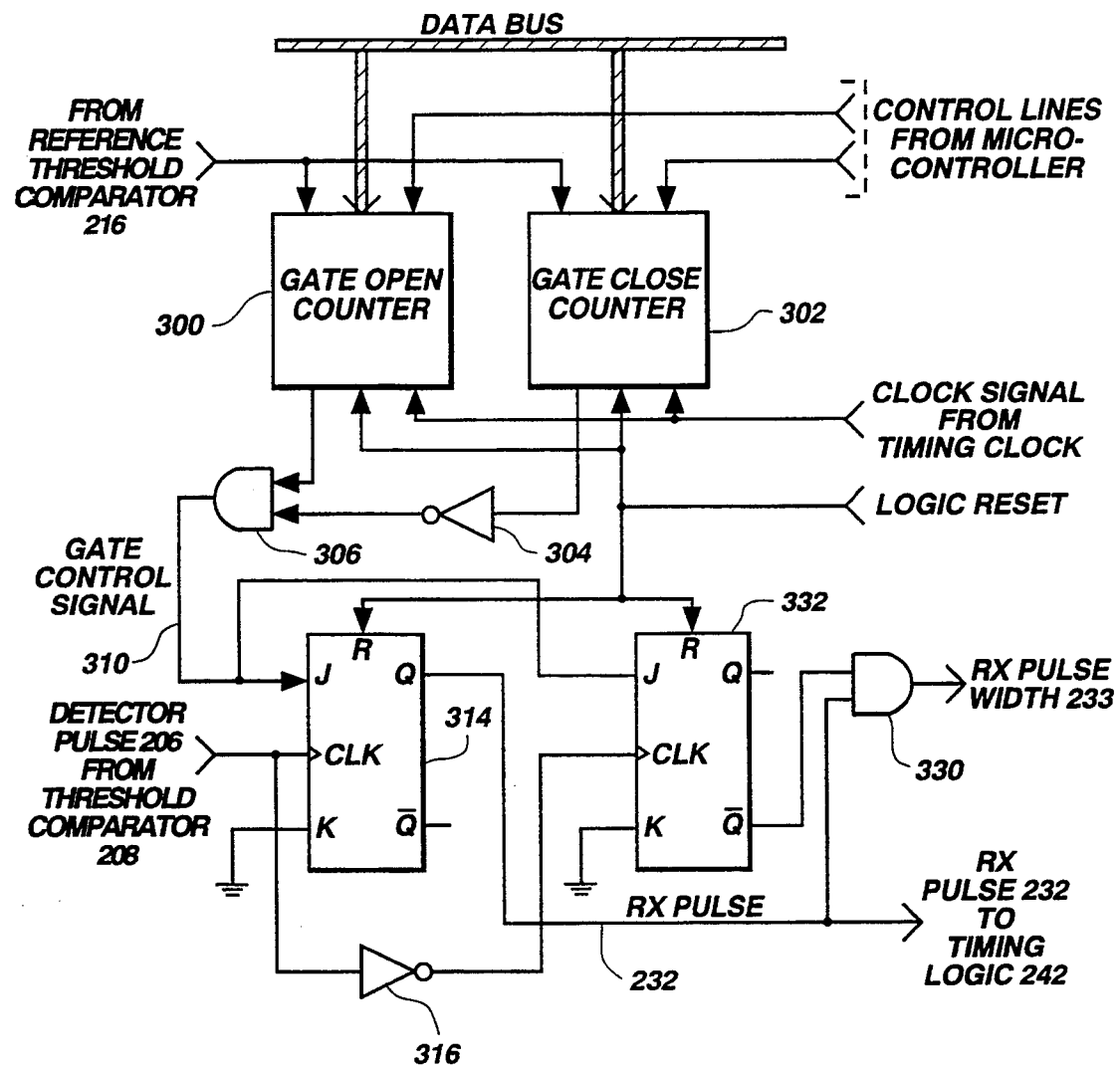
FIG. 3 is a functional schematic of the gating circuitry of the timing logic of FIG. 2.

As seen in FIG. 3, gating circuit 212 has 2 identical counters 300, 302 which are connected to microcontroller 60 by both logic control lines 122 and the main data buss, such that counters 300, 302 can be selectably set to desired values by microcontroller 60. Counters 300, 302 are also connected to receive a clock signal from clock 242. The REF pulse 218 is sent from threshold comparator 216 into both counters 300, 302. The output of counter 302 is sent through an inverting amplifier 304 and in turn goes to an and gate 306 along with the output of counter 300. And gate 306 outputs a gate control signal 310 which is active (logical 1) when "gate open" counter 300 finishes counting the delay (the first time period). Gate control signal 310 becomes inactive (logical 0) when the second preset time period in "gate close" counter 302 elapses.

The detector pulse 206 from threshold comparator 208 is connected both to the clock input CLK of an edge clocked J-K flip-flop 314 and to an inverting amplifier 316. Gate control signal 310 is sent to the J input of flip-flop 312. Flip-flop 312 is configured so that it will only respond to a rising edge at clock input 312 when gate control signal 310 is active. Also, J-K flip-flop 312 only changes state on the first clock edge that occurs during the active period; all other clock edges will be ignored. When gate control signal 310 is active, flip-flop 314 outputs the rising edge of the RX pulse 232 at the Q output.

RX pulse 232 is then sent to timing logic 240 and also to an and gate 330 which also receives input from the not-Q output of a second J-K flip-flop 332. Flip-flop 332 receives detector pulse 206 at its CLK input, after detector pulse 206 has been passed through inverting amplifier 316. Flip-flop 332 also receives gate control signal 310 at the J input. Thus, when gate control signal 310 is active, flip-flop 332 responds to the falling edge of the detector pulse 206. The NOT Q output of flip-flop 332 is then sent to and gate 330, along with RX pulse 232 which is the signal from the Q output of flip-flop 314. The output of and gate 330 is the RX pulse width signal 233 that is sent to a pulse width circuit 235 for determining its width. The use of the second flip-flop 332 ensures that only one pulse is passed to the pulse width circuit for each RX pulse 232.

Pulse width signal 233 is processed by a pulse width measuring circuit 235, sent to A/D converter 234, and then to microcontroller 60. Microcontroller 60 compares the pulse width value of signal 233 to a lookup table stored in EEPROM 284 to find the appropriate pulse width correction factor to correct for variations in the strength of the reflected laser light received by APD 202. That is, detector efficiency is non-linear and high power signals tend to saturate the detector and/or the amplification circuitry, causing a shift in the time at which the leading edge of the RX pulse exceeds the threshold of comparator 208. Most light detectors and amplifiers practicable for such apparatuses do have non-linear detection efficiency. The pulse-width correction takes the form of an additive correction to the distance determined from the time-of-flight measurement.

Figure 4B:
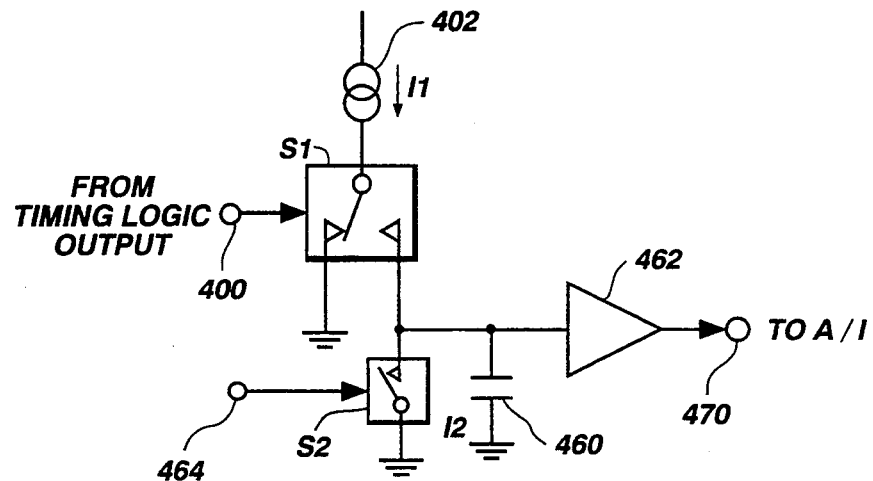
FIG. 4B is a functional schematic of an alternate embodiment of a charge pump circuit useful as interpolation circuit 250 or 252.

The RX pulse width measuring circuit 235 uses a charge pump circuit essentially identical to that shown in FIG. 4B. However, for the pulse width circuit 235 some of the component values differ from those used in the charge pump circuits 700, 702 (used as interpolation circuits, see FIG. 7). This difference is because the range of pulse widths found for RX pulse 232 differs as compared to the REF and RX interpolation pulses from the timing logic.

Figure 6:
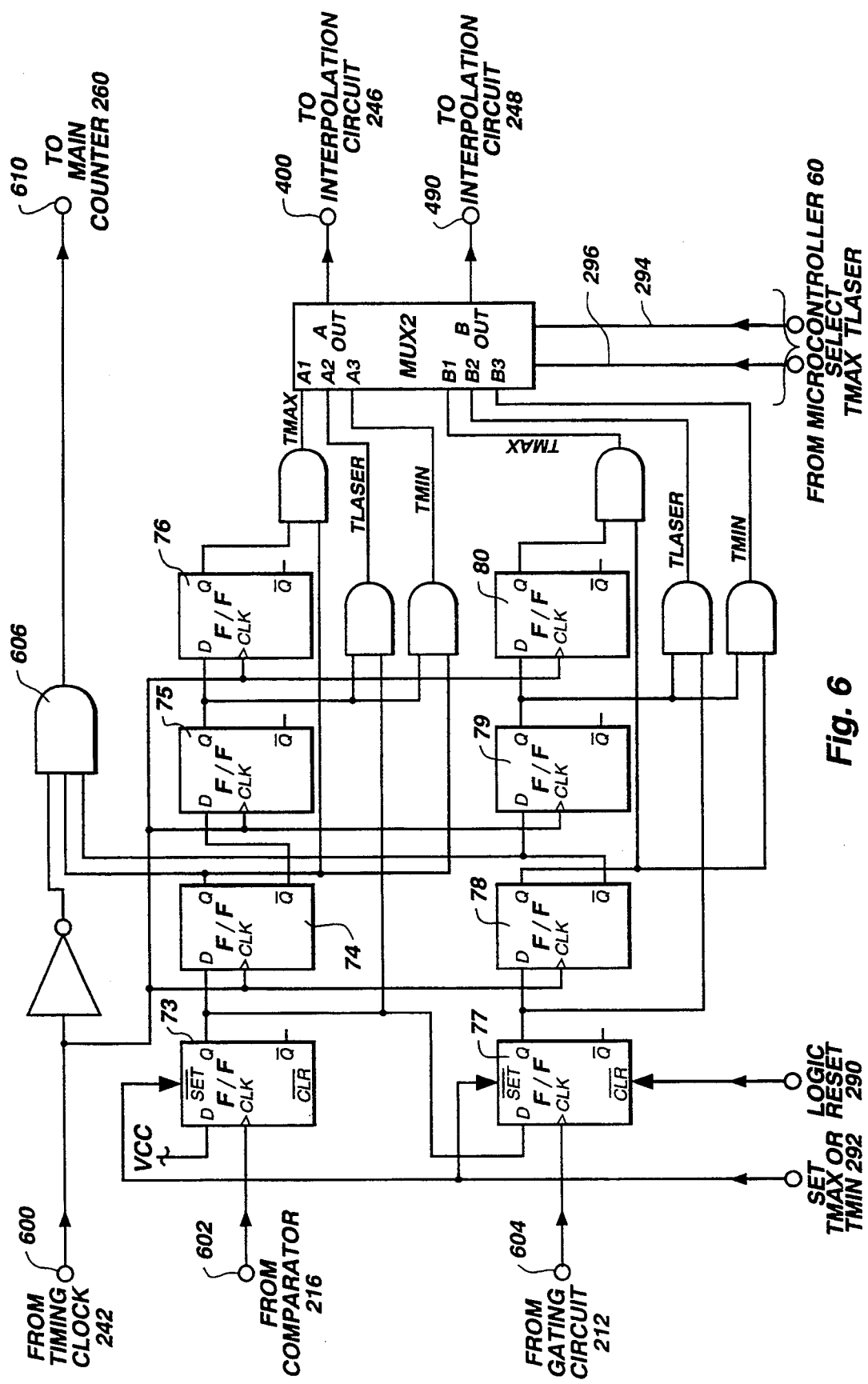
FIG. 6 is a functional schematic of a timing logic circuit 240.

Timing logic circuit 240, depicted in greater detail in FIG. 6, is configured to perform the following functions. First, it gates the signal from the clock 242 to the main counter 260 between the respective rising edges of the REF and RX pulses 218, 232. Main counter 260 then counts the number of complete cycles of REF pulse 218 and RX pulse 232. Second, timing logic 240 uses the signal from clock 242 to generate calibration pulses TMIN and TMAX, which are separated by a known integral number of periods of clock 242, with neither TMIN nor TMAX being equal to 0. TMIN and TMAX together define an interpolation width, e.g., an interval which is defined with respect to the known clock period, in which the precise fraction of the clock period at which a pulse such as REF or RX pulses 218, 232 arrives, can be determined. Calibration pulses TMIN and TMAX are both sent to interpolation circuits 246, 248 for processing to produce calibration values TMIN-REF, TMAX-REF and TMIN-RX, TMAX-RX respectively.

Finally, timing logic 240 derives a REF interpolation pulse from REF pulse 218, and sends it to be processed by REF interpolation circuit 246. A corresponding REF interpolation count is acquired by REF interpolation counter 250, from which it can be read by microcontroller 60. An RX interpolation pulse is similarly produced and processed by RX interpolation circuit 248 and interpolation counter 252. All of the TMIN-REF, TMAX-REF, TMIN-RX, TMAX-RX, REF and RX count values acquired by interpolation counters 250, 252, as well as the integral clock count of main counter 260, can be read by microprocessor 60 from the counters when so directed by the internal configuration stored in ROM 282.

In the embodiment illustrated in FIG. 6, TMIN has a duration equal to exactly one cycle of timing clock 242 and TMAX has a duration equal to exactly two cycles of timing clock 242. However, alternatively TMIN and TMAX may vary between any convenient integral or half-integral number of clock periods, for example between ½ and 1½ clock periods, or between 1 and 3 clock periods, so long as TMIN is not zero. The latter restriction is important because electronic circuits do not operate instantaneously, and there would be nonlinearity as the interpolation pulse width approached zero. Also, as the pulse width of a REF or RX interpolation pulse approached zero, considerable ringing and distortion would occur on the capacitor wave form when the current switch in the pulse stretcher-type interpolation circuit switches. These noted effects would contribute significant errors if TMIN were zero.

FIG. 6 depicts a working embodiment of a timing logic circuit 240 in greater detail. A periodic clock signal from clock 242 is received at input 600, reference pulse 218 from comparator 216 enters at input 602, and RX pulse 232 at input 604. Input 600 from timing clock 242 is connected to a three-input and gate 606 which opens when reference pulse 218 arrives at input 602 to transmit clock signals to output 610 to main counter 260.

Timing logic circuit 240 has an associated crystal controlled timing clock 242, which is desirably of high stability and high accuracy. Timing clock 242 provides a periodic clock signal 243 comprising a series of pulses equally spaced at a preset time period. Timing logic circuit 240 with interpolation circuits 246, 248, interpolation counters 250, 252 and main counter 260, produces timing data representing the elapsed time between a selected point on reference signal 218 and an equivalent selected point on RX signal 232 in terms of the number of pulses of clock signal 243. In the instant embodiment, the selected points are the rising edge of reference pulse 218 and the rising edge of RX pulse 232.

However, the period of timing clock 242 is too large to offer good resolution. Therefore, interpolation circuit circuits 246, 248 are operably associated with timing logic 240 for expanding the time duration of the fractional portions of the respective clock intervals at which the rising edge of the reference pulse and the rising edge of the RX pulse occur.

Each of interpolation circuits 246, 248 takes an input pulse from the timing logic and generates an output pulse of longer duration. Desirably, the output pulse has been expanded by a factor of at least about 100 to 150 fold over the input pulse. Interpolation circuit circuits 246, 248 should be constructed such that the variation of duration of the output pulse is as nearly in exact proportion to the variation of duration of the input pulse as possible. The expanded output pulse is then sent to start interpolation counter 250 and end interpolation counter 252, providing them with a count reflective of the fractional portions.

Interpolation circuits 246, 248 may be constructed in various ways to accomplish the general purpose of accurately determining the precise fractional times of the clock period at which the REF and RX pulses arrive. Interpolation circuit 246 receives REF interpolation pulse 400 from timing logic 240, while interpolation circuit 248 receives RX interpolation pulse 490 (see FIG. 6).

Figure 4A:
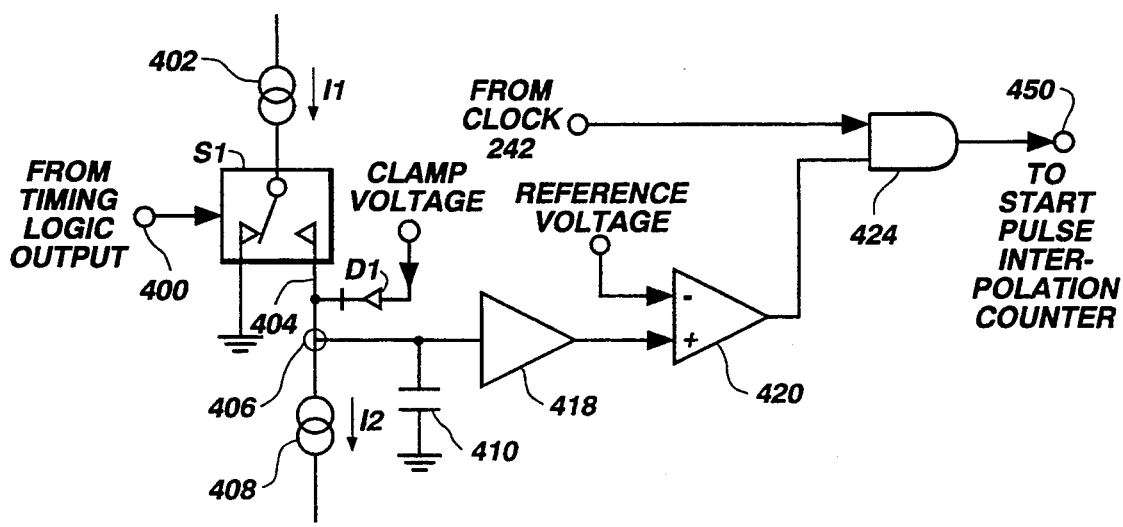
FIG. 4A is a functional schematic of an embodiment of a pulse stretcher circuit useful as interpolation circuit 250 or 252.

FIG. 4A depicts one embodiment of interpolation circuits, which is a pulse stretching circuit. The pulse stretching circuit is depicted in general functional form; various resistors and like minor components are not shown as selection of the position and values of such components will be apparent to those skilled in the art. FIG. 4 depicts a single pulse stretcher circuit; interpolation circuits 246 and 248 would each be such a pulse stretcher circuit and equivalent in all respects, except that REF interpolation circuit 246 receives REF pulse output from timing logic 240 and provides the interpolated REF output to REF interpolation counter 250, while interpolation circuit 248 receives the RX pulse output and provides the stretched RX pulse signal to end interpolation counter 252.

At the start of a measurement cycle, the input 400 from timing logic 240 is at logic zero and current I1 is switched to ground. The current I2 into constant current sink 408 discharges capacitor 410 until diode D1 conducts and balances current I2. The voltage on capacitor 410 is then the clamp voltage minus the voltage drop across D1. Thus, when the timing input 400 goes high capacitor 410 is charged by the current difference (I1-I2). The circuit component values are selected such that capacitor 410 charges rapidly when current I1 flows to output 404.

The voltage across capacitor 410 is buffered by a voltage follower 418 and is sent to the positive input of a comparator 420. Comparator 420 in turn sends its output to an and gate 424. And gate 424 also receives clock signals from clock 242, and in turn provides an output 450 to interpolation counter 250. Desirably, the reference voltage to comparator 420 is set to ensure that the switching point of the comparator is always in the linear portion of the charge and discharge period and clear of any ringing and distortion.

When the voltage received by comparator 420 at the positive input from voltage follower 418 exceeds the reference voltage on the negative input, the output from comparator 420 goes high. This allows clock pulses from timing clock 242 to flow through to an input 450 to interpolation counter 250, since the output to the interpolation counter is the logical "and" of the output of comparator 420 and clock 242. When input 400 from timing logic 240 goes back to logic zero, switch S1 again changes over so that I1 is diverted to ground. Capacitor 410 now discharges at a much slower rate due to I2. When the voltage on capacitor 410 falls below the reference voltage, the output of comparator 420 drops back to logic zero. At this point in time, interpolation counter 250 contains a count that relates to the width of the output pulse 450.

Capacitor 410 continues to discharge until the initial conditions are again reached whereby D1 is conducting and balancing I2. The reference voltage is desirably set so that the threshold of comparator 420 is near the fifty percent point on the charging path for the TMIN pulse. This gives maximum freedom from error effects due to ringing and non-linearity at the switching points.

Figure 5:
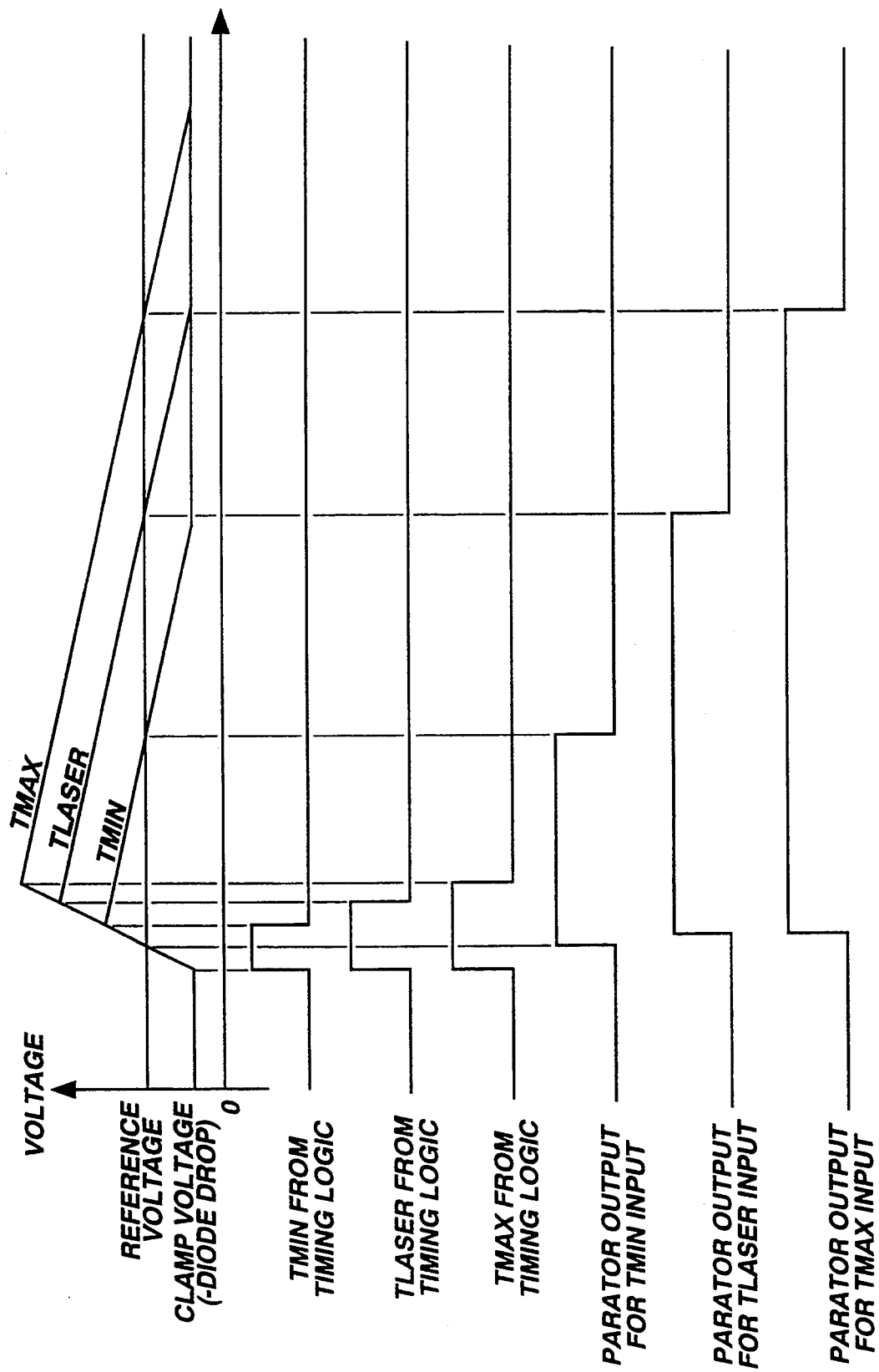
FIG. 5 is a waveform diagram for pulse stretchers 250, 252.

FIG. 5 shows a pulse expansion for the TMIN, TLASER and TMAX pulses wherein TMIN is one clock cycle in duration, TMAX is two cycles and TLASER varies between one and two cycles.

The variation in duration of output pulse 450 is precisely proportional to the variation in duration of the input pulse 400. Therefore, [TMAX-REF minus TMIN-REF] represents exactly one clock period of clock 242. Similarly, [TLASER-REF minus TMIN-REF] represents the fractional portion of the clock period following arrival of REF pulse 218. Therefore,

[TLASER-REF−TMIN-REF]÷[TMAX-REF−TMIN-REF] is a numeric fraction representing the REF fractional portion. Since this fraction is a ratio of two numbers which were expanded in the same proportion, the exact value of the pulse expansion is not important. Also, errors in determination of this fractional time due to component tolerances or drift in the pulse stretcher circuit, are substantially eliminated. Similarly,

[TMAX-RX−TLASER-RX] ÷[TMAX-RX−TMIN-RX] is the RX fractional portion.

The total number of elapsed clock periods between the REF and RX pulses is then equal to the sum of the two fractions above plus the number of whole clock periods.

An alternate and preferred embodiment of an interpolation circuit is shown in FIG. 4B. This circuit operates generally as a charge pump, but still performs essentially the same interpolation function as the pulse stretching circuit depicted in FIG. 4A. In the charge pump embodiment of FIGS. 4B and 7, the REF and RX interpolation pulses are converted to voltages that are proportional to the width of the pulses, and sent to an A/D converter. This is in contrast to the embodiment of FIGS. 2 and 4A, in which the REF and RX interpolation pulses are converted to stretched pulses and counted by counters 250, 252. Otherwise, the routing of the REF and RX interpolation pulses and the self-calibration pulses TMIN, TMAX, through the charge pump interpolation circuits 700, 702 (FIG. 7), is the same as for the pulse stretcher interpolation circuits 246, 248 (FIG. 2). The computations by microcontroller 60 are also the same as for the embodiment of FIG. 2.

The charge pump embodiment is preferred because it offers a much greater expansion factor, up to 1000-fold expansion or more, as compared to 150-fold for the pulse stretcher of FIG. 4A.

In the embodiment of FIG. 4B, switch S1 is set to divert the current from constant current source 402 to ground. Instead of a diode and a current sink, a second switch CS2 is connected to the other position of switch S1. Switch S2 is closed so that capacitor 460 is discharged and therefore the output voltage of buffer 462 is zero. Before timing logic 240 sends a REF pulse 218 or an RX pulse 232, the logic reset signal received at input 464 is set inactive, which opens switch S2.

Upon receipt of a REF pulse or RX pulse from timing logic 240, switch S1 goes to the opposite position and sends current I1 to charge the capacitor 460 for the duration of the pulse. After the pulse has passed, switch S1 diverts current I1 back to ground. Since the current I1 is effectively constant during the pulse, the resulting voltage charged across capacitor 460 during the pulse is proportional to the width of the pulse.

The voltage across capacitor 460 is buffered by buffer 462 and sent to an A/D converter (see FIG. 7), where it is converted to an integer value.

Figure 7:
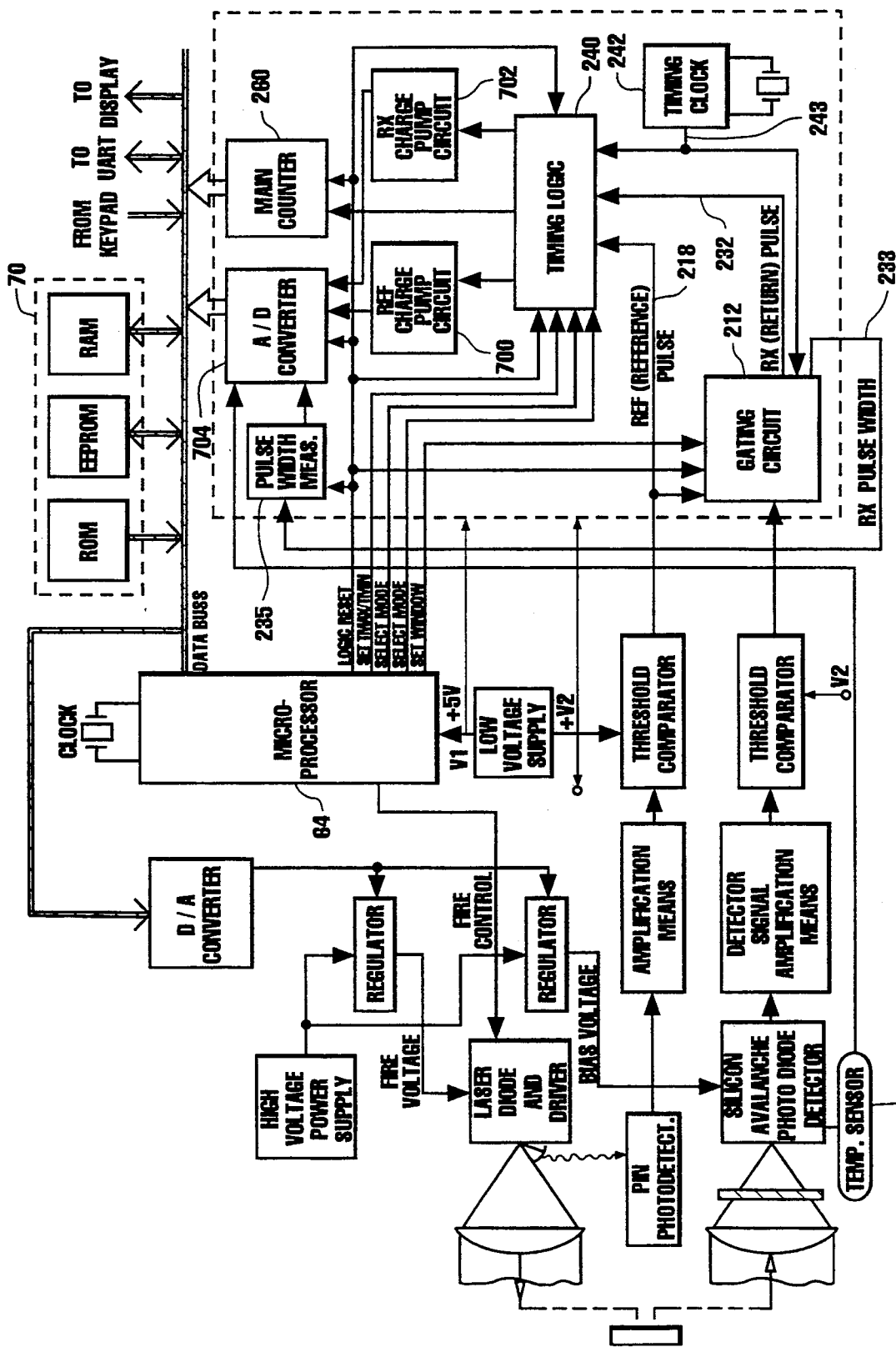
FIG. 7 is a block diagram of an alternate embodiment wherein interpolation circuit 250 is the charge pump circuit of FIG. 4B.

FIG. 7 depicts an alternate embodiment of the laser rangefinder 30, having certain changes in timing analysis circuitry 114 necessitated by the substitution of REF and RX charge pump interpolators 700, 702, configured as in FIG. 4B, for the interpolation circuits 246, 248 of FIG. 2. In particular, the interpolation counters 250, 252 of FIG. 2 are replaced by an A/D converter 704 which receives the output from charge pump interpolators 700, 702. Also, charge pump interpolators 700, 702 do not require an input from clock 242. A/D converter 234 which received the pulse width signal 233 from gating circuit 212 and the temperature signals from temperature sensor 270, is eliminated and the noted elements now are connected to A/D converter 704.

Microcontroller 60 is further constructed to compute the speed of the target relative to the observer from the difference in distances measured to the target for at least one pair of laser pulses, divided by the time elapsed between firing of the two pulses. Desirably, to enhance the accuracy of the speed measurement and compensate for errors due to bad target conditions, poor user operation of the device, and the like, the speed is computed from multiple such pairs of measurements. One method is to simply average the speeds obtained from multiple measurement pairs over a selected time or distance-change range. However, a highly preferred form of the computation utilizes a least-squares algorithm.

The least-squares algorithm as used to compute the speed is as follows:

$$(S=\text{speed})\ 2S = c * [\{n * \Sigma(x_i * Y_i) - \Sigma x_i * \Sigma Y_i\} \div \{(n * \Sigma(x_i * y_i) - \Sigma x_i * \Sigma x_i\}],$$

where n=sample size (# of laser pulse pairs);
$x_i$=the elapsed time between two pulses in the ith pair;
$y_1$=the flight time for the ith pulse;
$\Sigma$=summation over all i;
'*' denotes multiplication, '+' denotes division; and
c=speed of light.

The range (distance to the target) measurement is simply derived from the sum of the flight times during a selected measurement period:

$$d = c/2 * [\Sigma y_i]/n$$

With this algorithm, the calculated range to the target is the range at the midpoint of the measurement period. Furthermore, in the preferred embodiment, the speed and range calculations are carried out as completely independent operations using the same time-of-flight data. That is, during the computation of the speed, there is no explicit calculation of the range values.

Figure 8:
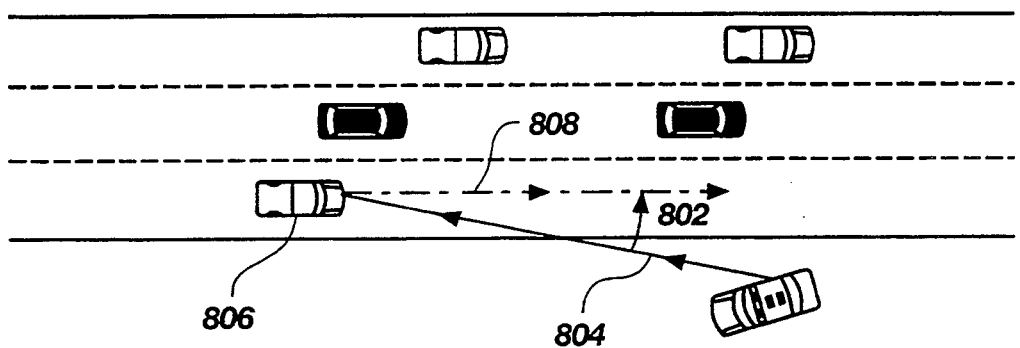
FIG. 8 is a diagram illustrating the desired position of the illustrated embodiment relative to a target during speed measurement.

It will further be apparent that the speed detector as constructed to compute speed as described in the preceding paragraph, determines speed of a moving target on the assumption that the target is traveling directly towards or away from the detector in a substantially straight path. It can be shown that for the most accurate speed determination with this embodiment, the detector should be positioned relative to the target, such that the angle 802 between the direction of the laser pulses 804 and the travel path of the target 806 is ≦about 10° (see FIG. 8). If angle 802 is greater than about 10°, the computed speed value will be significantly less than the actual speed of the target.

The disclosed laser speed detector has numerous advantages. It is very compact, lightweight, easy to use, and highly accurate. The user can visually identify the target while simultaneously directing the laser rangefinder at that specific target. Or, a camera may be associated with the scope of the rangefinder for taking pictures of a target whose speed is being detected. The readings may be displayed as appropriate on the display, sent to the UART to be downloaded to other electronic devices, or the like. The keypad in conjunction with the microcontroller, is provided for a user to select and initiate any automatic measuring modes which the microcontroller is configured to control.

Furthermore, the timing analysis circuitry of the laser rangefinder portion offers considerably improved accuracy to the distance measurement. This improved accuracy is especially due to the self-calibrating interpolation feature. The rangefinder also has a high capability to discriminate between noise and/or false return signals generated by structures near the target, by effectively "locking on" to signals returned from the true selected target. This "locking on" capability is due to the incorporation of a digital logic gating circuit providing adjustment of both the beginning and the end of the time window, plus the configuration of the microprocessor to independently vary the beginning and end of the window, and to alternately widen and narrow the window, until the window which most accurately defines the true return pulse from the target is established.

Although a preferred form of the invention has been herein disclosed, many substitutions are possible without departing from the concept of the invention. The claims themselves define the scope of that which is regarded as the invention.

What is claimed is:

1. A laser speed detector, comprising: a housing having dimensions suitable for being hand-held during operation;

a power source positioned Within said housing and providing a high voltage output and a low voltage output as required to other components;

a laser rangefinder system disposed within said housing, including a laser pulse generator and laser light detection means, and constructed to determine the time-of-flight of a laser pulse to a target and back to said light detection means;

a sighting scope attached to said housing and operably associated with said laser rangefinder such that when a user views a selected target through said sighting scope, said laser pulse generator and said light detector are simultaneously aimed at said selected target;

a trigger mounted to said housing to be operable by a user to trigger operation of said speed detector when said laser pulse generator is aimed at said selected target; and control means including a microcontroller having memory means for storing instructions and data, said microcontroller being communicatively interconnected to said Dower source and said laser rangefinder and said control means being configured to:

calculate a plurality of distances to said target from said flight times and the speed of light, each corresponding to a different successive ones of a series of laser pulses; and calculate a velocity of said target relative to said observer based on said distances and the elapsed time between the individual said pulses corresponding to said distances.

2. The speed detector of claim 2, further including gating means operable associated with said laser rangefinder system and said microcontroller for providing an adjustable time window relative to an outgoing laser pulse, such that only a return pulse failing within said time window is used to compute one of said time-of-flight measurements, said gating means and said microcontroller being mutually configured for selectable setting of either or both an opening time and a closing time of said adjustable time window.

3. The speed detector of claim 2, wherein said gating means is a digital logic gating circuit having an edge-sensitive window constructed such that only a pulse whose rising edge falls within the window is accepted and transmitted.

4. The speed detector of claim 2, wherein said microcontroller is configured to adjust said adjustable time window in an iterative fashion from larger to smaller and smaller to larger, to thereby focus said adjustable time window to distinguish a detector signal resulting from said return pulse from a false detector signal resulting from other causes.

5. The speed detector of claim 1, wherein said light detection means produces an RX (return) pulse in response to detection of light reflected from said target, and said laser rangefinder system further includes reference pulse means for generating an REF (reference) pulse representative of the time of firing of said laser pulse; and timing analysis circuitry connected to receive said RX pulse and said REF pulse, having a clock which produces a clock signal comprising periodic pulses separated by a known time interval, and operable to produce count data relating to the elapsed time between said REF and RX pulses, wherein said count data comprise a whole number of said periodic pulses occurring between said REF and said RX pulses plus calibrated REF and RX interpolated values reflective of the fractional portions of the respective clock periods during which said REF and RX pulses are received, said timing analysis circuitry being further constructed to produce self-calibration pulses and to process said self-calibration pulses in the same manner as said REF and RX pulses to produce calibration count values; and wherein said microcontroller is further configured to read said calibration count values and to calculate said time-of-flight from said calibration count values, said count data, and the speed-of-light.

6. The speed detector of claim 5, wherein said timing analysis circuitry defines an interpolation interval equal to an integral number of said clock periods, and further includes a reference pulse interpolation circuit for interpolating a value TLASER-REF representing a fractional time within a said clock period at which said reference pulse arrives at said detector, said value TLASER-REF being determined with respect to said interpolation interval.

7. The speed detector of claim 6, wherein said timing analysis circuitry further includes an RX (returned) pulse interpolation circuit for interpolating a fractional value TLASER-RX of a fractional time within a later said clock period at which said RX pulse arrives at said detector, said value TLASER-RX being determined with respect to said interpolation interval.

8. The speed detector of claim 7, wherein said timing analysis circuitry is further constructed to generate a pair of calibration pulses respectively referred to as TMIN and TMAX and spaced to define said interpolation interval; wherein said timing analysis circuitry subjects said calibration pulses to a said reference interpolation circuit to produce a pair of calibration values TMIN-REF, TMAX-REF, and wherein said timing analysis circuitry further subjects said calibration pulses to said RX interpolation circuit to produce a second pair of calibration values TMIN-RX, TMAX-RX.

9. The speed detector of claim 8, wherein said control means reads a number of whole clock pulses from said main counter, reads TMIN-REF, TMAX-REF, TLASER-REF, TMIN-RX, TMAX-RX and TLASER-RX from said interpolation means, and calculates said time-of-flight from said calibration values, said number of whole clock pulses and said REF and RX values.

10. The speed detector of claim 1, wherein said laser rangefinder further includes
a first collimator operably disposed for directing a major portion of said laser pulse toward a target, and reference pulse means comprising a second collimator operably disposed for directing a minor portion of said laser pulse to said light detection means to produce said reference pulse.

11. The speed detector of claim 10, wherein said fight detection means includes a first light detector having operably associated focussing means for receiving and focussing said reflected laser fight, and producing an RX pulse in response to detection of said reflected laser light; and a second light detector disposed for detection of said minor portion of said laser pulse, and producing said reference pulse in response thereto.

12. The speed detector of claim 8, wherein said calibration count values are calculated at least once each time said trigger is operated to initiate firing of said laser pulse.

13. The speed detector of claim 5, wherein said timing analysis circuitry includes a digital logic gating circuit operably associated with said return pulse detector and said microcontroller for selecting RX pulses having a rising edge which is detected within an adjustable time window, and transmitting only said selected RX pulses to said timing logic circuit for further processing said microcontroller and said digital logic gating circuit are mutually configured for selectable setting of either or both an opening time and a closing time of said adjustable time window.

14. The speed detector of claim 13, wherein said control means is configured to adjust said adjustable time window in an iterative fashion from larger to smaller and smaller to larger, to thereby focus said adjustable time window to distinguish a detector signal resulting from laser pulse light returned from said chosen target, from a false detector signal resulting from other causes.

15. The speed detector of claim 2, wherein said light detection means produces an RX (return) pulse in response to detection of light reflected from said target, and said laser rangefinder system further includes reference pulse means for generating an REF (reference) pulse representative of the time of firing of said laser pulse; and timing analysis circuitry connected to receive said RX pulse and said REF pulse, having a clock which produces a clock signal comprising periodic pulses separated by a known time interval, and operable to produce said count data relating to the elapsed time between said REF and RX pulses, wherein said count data comprise a whole number of said periodic pulses occurring between said REF and said RX pulses, plus calibrated REF and RX interpolated values reflective of the fractional portions of the respective clock periods during which said REF and RX pulses are received; and wherein said microcontroller is further configured to read said calibration count values and to calculate said time-of-flight from said calibration count values, said REF and RX count data, and the speed of light.

16. The speed detector of claim 15, wherein said timing analysis circuitry defines an interpolation interval equal to an integral number of said clock periods, and further includes a reference pulse interpolation circuit for interpolating a value TLASER-REF representing a fractional time within a said clock period at which said reference pulse arrives at said detector, said value TLASER-REF being determined with respect to said interpolation interval.

17. The speed detector of claim 16, wherein said timing analysis circuitry further includes an RX (returned) pulse interpolation circuit for interpolating a fractional value TLASER-RX of a fractional time within a later said clock period at which said RX pulse arrives at said detector, said value TLASER-RX being determined with respect to said interpolation interval.

18. The speed detector of claim 17, wherein said timing analysis circuitry is further constructed to generate a pair of calibration pulses respectively referred to as TMIN and TMAX and spaced to define said interpolation interval; wherein said timing analysis circuitry subjects said calibration pulses to a said reference interpolation circuit to produce a pair of calibration values TMIN-REF, TMAX-REF, and wherein said timing analysis circuitry further subjects said calibration pulses to said RX interpolation circuit to produce a second pair of calibration values TMIN-RX, TMAX-RX.

19. The speed detector of claim 18, wherein said control means reads a number of whole clock pulses from said main counter, reads TMIN-REF, TMAX-REF, TLASER-REF, TMIN-RX, TMAX-RX and TLASER-RX from said interpolation means, and calculates said time-of-flight from said calibration values, said number of whole clock pulses and said REF and RX values.

20. The speed detector of claim 15, wherein said speed detector further includes a first collimator operably disposed for directing a major portion of said laser pulse toward a target, and said reference pulse means is a second collimator operably disposed for directing a minor portion of said laser pulse to said light detection means to produce said reference pulse.

21. The speed detector of claim 20, wherein said light detection means includes a first light detector having operably associated focussing means for receiving and focussing said reflected laser light, and producing said RX pulse; and a second light detector disposed for detection of said minor portion of said laser pulse, and producing said reference pulse in response thereto.

22. The speed detector of claim 18, wherein said calibration count values are calculates at least once each time said trigger is operated to initiate firing of said laser pulse.

23. A speed detector, comprising:

a housing;

a power source positioned within said housing and providing a high voltage output and a low voltage output as required to other components;

a laser pulse generator connected to receive high voltage from said power source and operable to fire a laser pulse toward a target;

reference pulse means for generating an REF (reference) pulse representative of the time of firing of said laser pulse;

light detection means for receiving and detecting light reflected from said target and in response producing an RX (return) pulse; and timing analysis circuitry connected to receive said RX pulse and said REF pulse, and operable to produce count data relating to the elapsed time between said REF and RX pulses, wherein said count data comprise REF count data and RX count data, and wherein said timing analysis circuitry is further constructed to produce self-reference-calibration pulses and to process said self-calibration pulses in the same manner as said REF and RX pulses to produce calibration count values;

a sighting scope attached to said housing and operably associated with said speed detector such that when a user sights on a target with said sighting scope, said laser pulse generator and said light detector are simultaneously aimed at said target; and a trigger mounted to said housing to be operable by a user to trigger operation of said speed detector when said speed detector is aimed at the target; and control means including a microcontroller having memory means for storing instructions and data, said microcontroller being communicatively interconnected to said power source, said laser pulse generator, and said timing analysis circuitry, wherein said microcontroller is configured to:
  read said calibration count values; and
  calculate said time-of-flight from said calibration count values, said REF and RX count data, and the speed of light.

24. The speed detector of claim 23, wherein said timing analysis circuit comprises:

a clock producing a clock signal comprising a periodic pulse having a known fixed period;

an input supplying start and end pulses defining an elapsed time period, said pulses having respective start and end arrival times, and said arrival times having respective fractional portions which fall within different individual periods of said clock;

timing interpolation circuitry connected to receive said clock signal and said start and end pulses, said timing interpolation circuitry being configured to:
  output an integral clock count reflective of the number of whole said clock periods elapsing between said start and end pulse arrival times,
  generate a pair of calibration pulses defining an interpolation interval, and process said calibration pulses to produce calibration clock values reflective of the relative spacing in time of said calibration pulses;
  interpolate said respective fractional portions within said interpolation interval to produce start and end clock values reflective of said respective fractional portions, said clock values being defined with respect to said calibration pulses; and means for acquiring counts comprising the number of integral said clock periods elapsing between said start and end pulses, said start and end clock values, and said calibration clock values, said means for acquiring counts being connected to said timing interpolation circuitry, and pulse selection means for selecting RX pulses detected within an adjustable time window, said pulse selection means being connected to said input and constructed to transmit only said selected RX pulses for further processing, said pulse selection means comprising a digital logic gating circuit operably associated with a microcontroller, said microcontroller and said digital logic gating circuit being mutually configured for selectable setting of either or both an opening time and a closing time of said adjustable time window.

25. The speed detector of claim 24, wherein said timing interpolation circuitry further includes:

a timing logic circuit receiving said start and end pulses and configured to output said integral clock count, and further constructed to generate start and end pulse fractions respectively reflective of said fractional portions of said start and end pulses;

start and end interpolation circuits respectively connected to receive said start and end pulse fractions, and constructed to output said clock values reflective of said fractional portions to said means for acquiring counts, wherein said interpolation interval comprises a known integral number of said clock periods, and said interpolation circuits each comprise a pulse stretcher circuit configured to proportionally expand the duration of said start and end pulse fractions and said calibration pulses.

26. The laser rangefinder of claim 24, wherein said microcontroller is configured to interact with said pulse selection means to adjust said adjustable time window in an iterative fashion alternating between larger-to-smaller and smaller-to-larger, to thereby focus said adjustable time window to distinguish a detector signal resulting from laser pulse light returned from said chosen target, from a false detector signal resulting from other causes.

27. In a laser rangefinder having a laser pulse generator, a light detector for detecting laser light, and timing analysis circuitry for determining the time-of-flight of a laser pulse to a remote target from a signal pair comprising a start signal generated upon sending of an outgoing laser pulse to the target and an RX signal produced in response to receipt of a reflected portion of the outgoing laser pulse by the light detector, a method of selecting an RX signal for further processing, comprising the steps of:

providing a gating circuit operably connected to receive the REF and RX signals and to transmit them for further processing, and having an adjustable time window which opens to transmit an RX signal at a selectable delay time following receipt of the REF pulse and closes at a selectable closing time to prevent transmission of the RX signal;

adjusting the time window upon receipt of a first REF pulse in the series of pulse pairs, to open at a relatively short first delay time and to close at a relatively late first closing time to provide a time window having a large first width, such that the corresponding first RX signal is received within the time window;

narrowing the time window upon receipt of a second REF pulse in the series, by adjusting the delay time and said closing time to produce a time window having a second narrower width and being approximately centered around the time at which the first RX signal was received;

further narrowing the time window and adjusting the delay time for a subsequent pair of REF and RX signals, if a second RX signal is received within the second narrowed window, or;

widening the time window for a subsequent pair of REF and RX signals, if a second RX signal is not received within the second narrowed window; and alternating said steps of further narrowing or widening the time window until a desired number of RX signals are received within a window range chosen on the basis of the distribution of a plurality of received detector pulses from the same target.

28. A timing analysis circuit for determining the elapsed time between two pulses in terms of the number of periods of a clock signal, including:

a clock producing a clock signal comprising a periodic pulse having a known fixed period;

an input supplying start and end pulses defining an elapsed time period, said pulses having respective start and end arrival times, and said arrival times having respective fractional portions which fall within different individual periods of said clock;

timing interpolation circuitry connected to receive said clock signal and said start and end pulses, said timing interpolation circuitry being configured to:

output an integral clock count reflective of the number of whole said clock periods elapsing between said start and end pulse arrival times, generate a pair of calibration pulses defining an interpolation interval, and process said calibration pulses to produce calibration clock values reflective of the relative spacing in time of said calibration pulses;

interpolate said respective fractional portions within said interpolation interval to produce start and end clock values reflective of said respective fractional portions, said clock values being defined with respect to said calibration pulses; and means for acquiring counts comprising the number of integral said clock periods elapsing between said start and end pulses, said start and end clock values, and said calibration clock values, said means for acquiring counts being connected to said timing interpolation circuitry.

29. The timing analysis circuit of claim 28, wherein said timing interpolation circuitry further includes:

a timing logic circuit receiving said start and end pulses and configured to output said integral clock count, and further constructed to generate start and end pulse fractions respectively reflective of said fractional portions of said start and end pulses; and start and end interpolation circuits respectively connected to receive said start and end pulse fractions, and constructed to output said clock values reflective of said fractional portions to said means for acquiring counts.

30. The timing analysis circuit of claim 29, wherein said interpolation interval comprises a known integral number of said clock periods, and said interpolation circuits each comprise a pulse stretcher circuit configured to proportionally expand the duration of said start and end pulse fractions and said calibration pulses.

31. The timing analysis circuit of claim 29, wherein said interpolation interval comprises a known integral number of said clock periods, and said interpolation circuits each comprise a charge pump circuit.

32. The timing analysis circuit of claim 28, further including means for selecting RX pulses detected within an adjustable time window, said selection means being connected to said input and constructed to transmit only said selected RX pulses for further processing.

33. The timing analysis circuit of claim 28, wherein said pulse selection means is further constructed to be edge-sensitive to transmit only pulses having a rising edge which is received while said window is open.

34. The timing analysis circuit of claim 33, wherein said pulse selection means is a digital logic gating circuit operably associated with a microcontroller, and wherein said microcontroller and said digital logic gating circuit are mutually configured for selectable setting of either or both an opening time and a closing time of said adjustable time window, and wherein said microcontroller is configured to interact with said pulse selection means to adjust said adjustable time window in an iterative fashion alternating between larger-to-smaller and smaller-to-larger, to thereby focus said adjustable time window to distinguish a detector signal resulting from laser pulse light returned from said chosen target, from a false detector signal resulting from other causes.

35. In a timing analysis device for determining the average elapsed time between pulses in a series of pulse pairs each comprising a start pulse generated upon sending of an outgoing signal and an RX pulse produced in response to receipt of a reflected portion of the outgoing signal by a signal detector, a method of selecting an RX pulse for further processing, comprising the steps of:

providing a gating circuit operably connected to receive the REF and RX pulses and to transmit them for further processing, and having an adjustable time window which opens to transmit an RX pulse at a selectable delay time following receipt of the REF pulse and closes at a selectable closing time to prevent transmission of the RX pulse;

adjusting the time window upon receipt of a first REF pulse in the series of pulse pairs, to open at a relatively short first delay time and to close at a relatively late first closing time to provide a time window having a large first width, such that the corresponding first RX pulse is received within the time window;

narrowing the time window upon receipt of a second REF pulse in the series, by adjusting the delay time and said closing time to produce a time window having a second narrower width and being approximately centered around the time at which the first RX pulse was received;

further narrowing the time window and adjusting the delay time for a subsequent pair of REF and RX pulses, if a second RX pulse is received within the second narrowed window, or;

widening the time window for a subsequent pair of REF and RX pulses, if a second RX pulse is not received within the second narrowed window; and alternating said steps of further narrowing or widening the time window until a desired number of RX pulses are received within a window range chosen on the basis of the distribution of a plurality of received detector pulses from the same target.

* * * * *

UNITED STATES PATENT AND TRADEMARK OFFICE
CERTIFICATE OF CORRECTION

PATENT NO. : 5,359,404

DATED : October 25, 1994

INVENTOR(S) : Jeremy Dunne

It is certified that error appears in the above-indentified patent and that said Letters Patent is hereby corrected as shown below:

Column 12, line 37, at end of the equation, change "{(n" to --{n--;

Column 12, line 43, change "$Y_1$" to --$Y_i$--;

Column 12, line 45, change "'+'" to --'+'--;

Column 13, line 2, change "$\leq$" to --$\leq$--;

Column 13, line 45, change "Within" to --within--;

Column 13, line 65, change "Dower" to --power--;

Column 14, line 2, change "claim 2" to --claim 1--;

Column 14, line 8, change "operable" to --operably--;

Column 14, line 11, change "failing" to --falling--;

UNITED STATES PATENT AND TRADEMARK OFFICE
CERTIFICATE OF CORRECTION

PATENT NO. : 5,359,404
DATED : October 25, 1994
INVENTOR(S) : Jeremy Dunne

It is certified that error appears in the above-indentified patent and that said Letters Patent is hereby corrected as shown below:

Column 15, line 30, change "fight" to --light--;

Column 17, line 23, after "self-" delete "reference-";

Column 15, line 61, change "claim 2" to --claim 1--; and

Column 20, line 12, change "28" to --32--.

Signed and Sealed this

Thirtieth Day of April, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,359,404
DATED : October 25, 1994
INVENTOR(S) : Jeremy G. Dunne

Page 1 of 1

It is certified that error appears in the above-identified patent and that said Letters Patent is hereby corrected as shown below:

Column 12,
Line 38, delete "$*\Sigma (x_i*y_i) - \Sigma xi*\Sigma x_i\}]$" and substitute therefor -- $*\Sigma (x_i*x_i) - \Sigma xi*\Sigma x_i\}]$ --.
Line 41, delete "between two pulses in the ith pair ";" and substitute therefor -- from the start of the measurement to the ith pulse; --.

Signed and Sealed this

Fourth Day of December, 2001

Attest:

*Nicholas P. Godici*

NICHOLAS P. GODICI
*Attesting Officer*     *Acting Director of the United States Patent and Trademark Office*